US009192187B2

(12) United States Patent
Amigoni et al.

(10) Patent No.: US 9,192,187 B2
(45) Date of Patent: Nov. 24, 2015

(54) METHOD FOR PREPARING A READY-TO-EAT FOOD TRAY

(71) Applicant: Barilla G. e R. Fratelli S.p.A., Parma (IT)

(72) Inventors: Michele Amigoni, Parma (IT); Giancarlo Tedeschi, Parma (IT); Andrea Bordini, Parma (IT); Pierluigi Azzali, Parma (IT)

(73) Assignee: Barilla G. e R. Fratelli S.p.A. (IT)

( * ) Notice: Subject to any disclaimer, the term of this patent is extended or adjusted under 35 U.S.C. 154(b) by 158 days.

(21) Appl. No.: 13/744,085

(22) Filed: Jan. 17, 2013

(65) Prior Publication Data

US 2014/0196410 A1 Jul. 17, 2014

(51) Int. Cl.

| | |
|---|---|
| ***A23L 3/10*** | (2006.01) |
| ***A23L 1/48*** | (2006.01) |
| ***B65B 29/08*** | (2006.01) |
| ***B65B 7/16*** | (2006.01) |
| *B65B 55/02* | (2006.01) |
| *B65B 7/28* | (2006.01) |

(52) U.S. Cl.

CPC . *A23L 1/48* (2013.01); *B65B 7/168* (2013.01); *B65B 29/08* (2013.01); *B65B 7/2878* (2013.01); *B65B 55/02* (2013.01); *B65B 2230/02* (2013.01)

(58) Field of Classification Search

CPC .......................................................... A23L 1/48
USPC ......... 426/407, 520, 114, 106, 108, 112, 115, 426/119, 120, 121, 123, 12

See application file for complete search history.

(56) References Cited

U.S. PATENT DOCUMENTS

| | | | | |
|---|---|---|---|---|
| 5,020,303 | A * | 6/1991 | Vokins | 53/432 |
| 5,571,473 | A * | 11/1996 | Fujii | 264/510 |
| 5,857,582 | A * | 1/1999 | Schulz | 220/269 |
| 6,251,489 | B1 * | 6/2001 | Weiss et al. | 428/35.2 |
| 2002/0012803 | A1 * | 1/2002 | Kending | 428/423.7 |
| 2009/0107871 | A1 * | 4/2009 | White et al. | 206/497 |
| 2009/0186131 | A1 * | 7/2009 | Roberts et al. | 426/114 |
| 2010/0242411 | A1 | 9/2010 | Boekstegers et al. | |

FOREIGN PATENT DOCUMENTS

| | | |
|---|---|---|
| JP | 11-222269 A | 8/1999 |

* cited by examiner

*Primary Examiner* — Rena Dye
*Assistant Examiner* — Preston Smith
(74) *Attorney, Agent, or Firm* — Akerman LLP

(57) ABSTRACT

A method for preparing a sterilized ready-meal package, including providing a main container defining a main volume intended to accommodate a main food product, and having a first opening at the upper part surrounded by a first planar edge. At least one secondary container defining a secondary volume is included and has a second opening at the upper part surrounded by a second planar edge. The secondary container is introduced inside the main container, so that said first edge and said second edge are flush. At least one secondary food product is introduced inside the secondary volume, and at least one main food product is introduced inside the main volume. A perimetric seal is made between a covering film, arranged to cover said first and second openings, and said first edge, and an inner seal is made between the covering film and the second edge.

16 Claims, 5 Drawing Sheets

2
2b
20
4
2e
3c
3
30
3d
1
2e
2a
2d
3a

METHOD FOR PREPARING A READY-TO-EAT FOOD TRAY

FIELD OF APPLICATION

The present invention refers to a method for preparing a ready-meal package, and in particular for preparing a package of the type that can be heated in a microwave oven, comprising at least two separate sterilised food products to be mixed prior to their consumption.

PRIOR ART

In order to meet the needs regarding limited availability of time for a large share of consumers, the industrial field in question produces and sells various types of food products ready for consumption, in most cases heatable in microwaves. Such products are usually referred to as "ready to heat" or "ready to eat" (depending on whether such ready meals require heating in a microwave).

Among the various types of ready meals, some comprise two separate food components to be mixed before consumption. Generally, one of such components has a liquid or semi-liquid consistency and it serves as a condiment for the other. The two components, for example, can be made up of pasta and a sauce to be mixed therewith or by cereals and condiment cream for the former.

Ready-meals packages of the aforementioned type in some cases comprise a single tray divided into two compartments, intended for the two separate components, and covered with a covering film.

A package of this type allows sterilising the food products after packaging. As a matter of fact, the physical separation of the two components prevents the passage of humidity towards the non-liquid part, preventing deterioration of its organoleptic properties.

However, in order to prevent the sterilisation from deteriorating the quality of food products, limiting the free volume present between the latter and the upper protection film, i.e. minimising the so-called "headspace", is of fundamental importance. This package need turns into a drawback of the described solution. As a matter of fact, in order to meet the headspace requirements, the two compartments of the tray are filled with the products to the brim, and there is absolutely no free space sufficient to mix the two components. Therefore, the consumer is forced to pour the two products into a separate plate, hence leading to unease due to the need of finding and washing such supplementary dishes.

Alternative package solutions, intended to solve the above-mentioned problem, provide for the use of a tray, without compartments, into which the two components are premixed. However, in such case, the sterilisation performed on the non-separated products, risks prejudicing the quality of the food.

An alternative solution employs separate packets for the two components and a rigid container for mixing and consumption; however, the production and package costs in this case increase considerably.

The use of a main container equipped with a secondary container nested therein is envisaged by one last solution. One of the two food components thus fills the secondary container, while the other is introduced into the volume of the main container left free by the secondary container. The package can be filled completely so as to minimise the headspace, after which it is sealed by a covering film and sterilised in an autoclave. At the moment of consumption, the covering film is removed and the secondary container is extracted, providing an additional volume for the mixing of the components inside the main container.

This last solution, whilst substantially meeting the current requirements of the field, nevertheless has some drawbacks that are yet to be solved, mainly linked to the attachment of the covering film.

The attachment of the covering film is typically obtained by heat sealing, carried out by conduction through a heated sealing head that is lowered on top of the film, exerting a given pressure for a given dwell time.

The sealing thus carried out must of course ensure characteristics of sufficiently high strength and tightness, both in view of the sterilisation in an autoclave and of the subsequent conservation of the product. The high strength of the seal, however, substantially hinders the removal of the film by the end consumer; in particular, it is extremely difficult to separate the film from the upper mouth of the secondary container.

In order to remove the film, the consumer grips a flap thereof, applying a force upwards, while with the other hand he holds the main container. The possibility of applying two opposing actions makes it substantially easier to open the perimetric seal that engages the main container. The secondary container is not, however, integral with the main container, nor is it easily accessible to the consumer who wishes to exert a holding action against it. Such a container thus tends to be pulled during the lifting of the film, without or only partially detaching from the film itself. As a result there is an annoying obstacle to the complete opening of the package, as well as the risk of tipping out the content of the secondary container during the operation.

It should also be noted that to make a sufficiently resistant seal for the sterilisation requirements in an autoclave it is necessary to apply a relatively high sealing pressure, indicatively around 10 bar. The outer perimeter of the package can be made projecting outwards, so as to be supported by a suitable counter-mould during such sealing operations. However, it is not possible to use the same provision for the inner portions, i.e. those not peripheral with respect to the package, of the secondary container. At such portions, the pressure of the sealing head is thus discharged onto the plastic wall below, and risks to cause damage to it.

SUMMARY OF THE INVENTION

Therefore, the technical problem on which the present invention is based is that of providing a method for preparing a sterilised ready-meal package, of the type comprising two containers nested inside one another for containing two food products sealed at the upper part by a single protective film, which allows the drawbacks of the prior art described above to be overcome.

The aforementioned technical problem is solved by a method for preparing a sterilised ready-meal package, comprising the steps of:

- providing a main container defining a main volume intended to accommodate a main food product, and having a first opening at the top part surrounded by a first planar edge;
- providing at least one secondary container defining a secondary volume and having a second opening at the top part surrounded by a second planar edge;
- introducing said secondary container inside the main container, so that said first edge and said second edge are flush;
- introducing at least one secondary food product inside the secondary volume;

introducing at least one main food product inside the main volume;

making, by means of a first sealing head facing the first edge, a perimetric seal between a covering film, arranged to cover said first and second opening, and said first edge;

making, by means of a second sealing head facing the second edge and physically distinct from the first sealing head, an inner seal between the covering film and the second edge.

A man skilled in the art will understand how the separation of the sealing step, conventionally carried out by means of a single sealing head, advantageously makes it possible to separately modulate the characteristics of strength and tightness of the perimetric and outer seal.

The owner has, indeed, observed how the high characteristic of strength required for the outer seal is not strictly necessary at the inner one, subjected to lower mechanical stresses. Thus, it is possible to make an inner seal that is less resistant, solving the drawbacks described above with reference to the methods of the prior art, i.e. the difficulty of removing the covering film and the risk of damaging the structure of the package during sealing.

In making the perimetric seal, the first sealing head applies a first pressure above the covering film; in making the inner seal the second sealing head applies a second pressure above the covering film. Said first pressure is preferably greater than said second pressure, in order to make the two seals with differentiated strength according to the requirements outlined earlier.

In particular, the first pressure is preferably greater than 5 bar, even more preferably comprised between 8 and 10 bar; the second pressure, on the other hand, is preferably less than 5 bar, even more preferably comprised between 2 and 3 bar.

The first pressure can be applied for example by means of a mechanical actuator, provided, for example, to seal ten packages at a time with a force of 45 kN.

The second pressure can be applied for example by means of pneumatic actuators provided to act on six packages at a time, applying a pressure ranging between 2 and 3 bar.

Again in order to differentiate the inner seal from the perimetric seal, it is possible to apply two different dwell times for the two different sealing heads. In particular, the dwell time of the first sealing head in making the perimetric seal can be greater than the dwell time of the second sealing head in making the inner seal.

For example, the dwell time of the first sealing head can be greater than 0.8 s (for example equal to 1 s) and the dwell time of the second sealing head can be less than 0.8 s (for example equal to 0.6 s).

In making the perimetric and inner seals the temperatures of the first and second sealing head can be greater than a melting temperature of the covering film, so as to make a heat seal. In particular, a heat seal is made through the heating of the sealing heads, which promote a heating of the interface portion between the covering film and the upper edges of the containers.

The covering film can be at least partially made (at the interface with the containers) from plastic material, for example it can comprise at least one inner layer of polypropylene, and the temperatures of the first and second sealing head can be comprised between 180° C. and 220° C. A slightly higher temperature can be selected for the first sealing head that makes the perimetric seal: such a head can for example be heated up to 200° C., whereas the second head is heated up to 195° C.

The first sealing head defines a first sealing profile, whereas the second sealing head defines a second sealing profile. Preferably, both of the sealing profiles are closed profiles.

Thanks to such a provision, the more resistant perimetric seal ensures the tightness of the package with respect to the outside, whereas the inner seal independently makes an inner seal for separating between the two foods, which in particular prevents migrations of humidity during a possible sterilisation in an autoclave.

In particular, the first sealing profile can follow said first edge, without involving the second edge; similarly, the second sealing profile will follow the peripheral path of the second edge.

The step of providing a main container can advantageously comprise a step of thermoforming the main container in polypropylene with co-extruded EVOH barrier; the step of providing the secondary container can, on the other hand, comprise a step of injection moulding the secondary container in polypropylene.

Said first edge can advantageously be made projecting outwards with respect to the ready-meal package, said step of making the perimetric seal involving the application of a counter-mould beneath said first edge.

This last provision makes it possible in particular to discharge the high sealing pressures applied by the first sealing head.

Said step of making the perimetric seal and said step of making the inner seal are preferably carried out at two distinct times; in particular, it is preferred to make the inner seal at a later time with respect to the perimetric seal.

The method according to the present invention can also comprise a step of sterilising the ready-meal package in an autoclave after the steps of making the perimetric seal and the inner seal.

The method according to the present invention can use one or more sealing stations to carry out the perimetric and inner seals. Such stations can in particular comprise at least one first sealing head and at least one second sealing head that are distinct from one another, respectively arranged to make said perimetric seal and said inner seal.

Preferably, there is a first sealing station equipped with the first sealing head and a second sealing station equipped with the second sealing head.

Further characteristics and advantages shall be clearer from the detailed description, outlined hereinafter, of some preferred but not exclusive embodiments of the present finding, with reference to the attached figures provided for exemplifying and non-limiting purposes.

DETAILED DESCRIPTION

Figure 1:
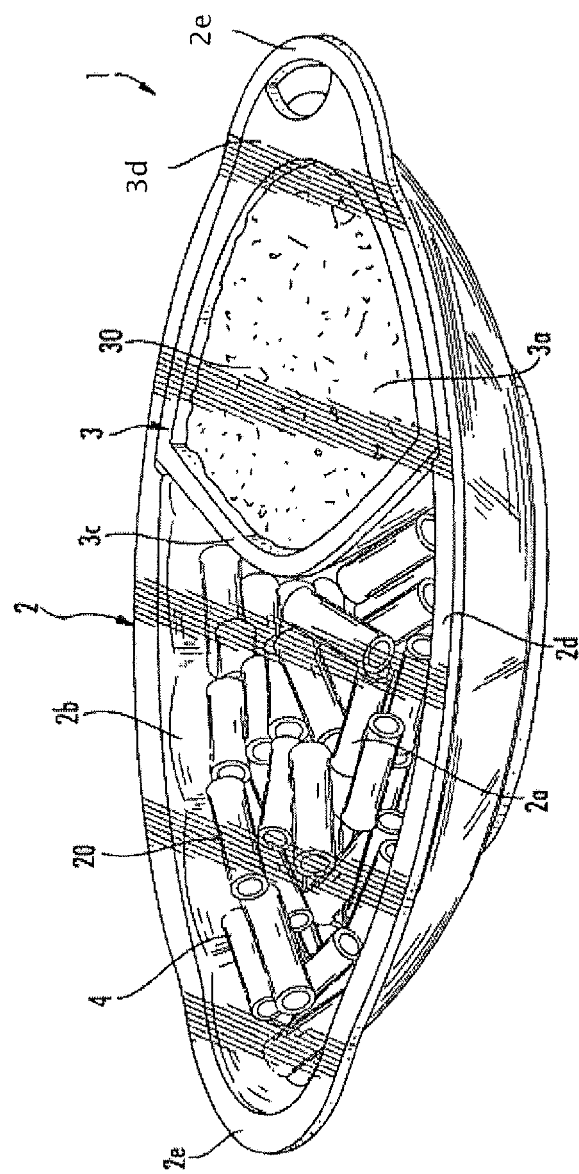
FIG. 1 is a perspective view of a first variant of a package made with the method according to the present finding.
Figure 2:
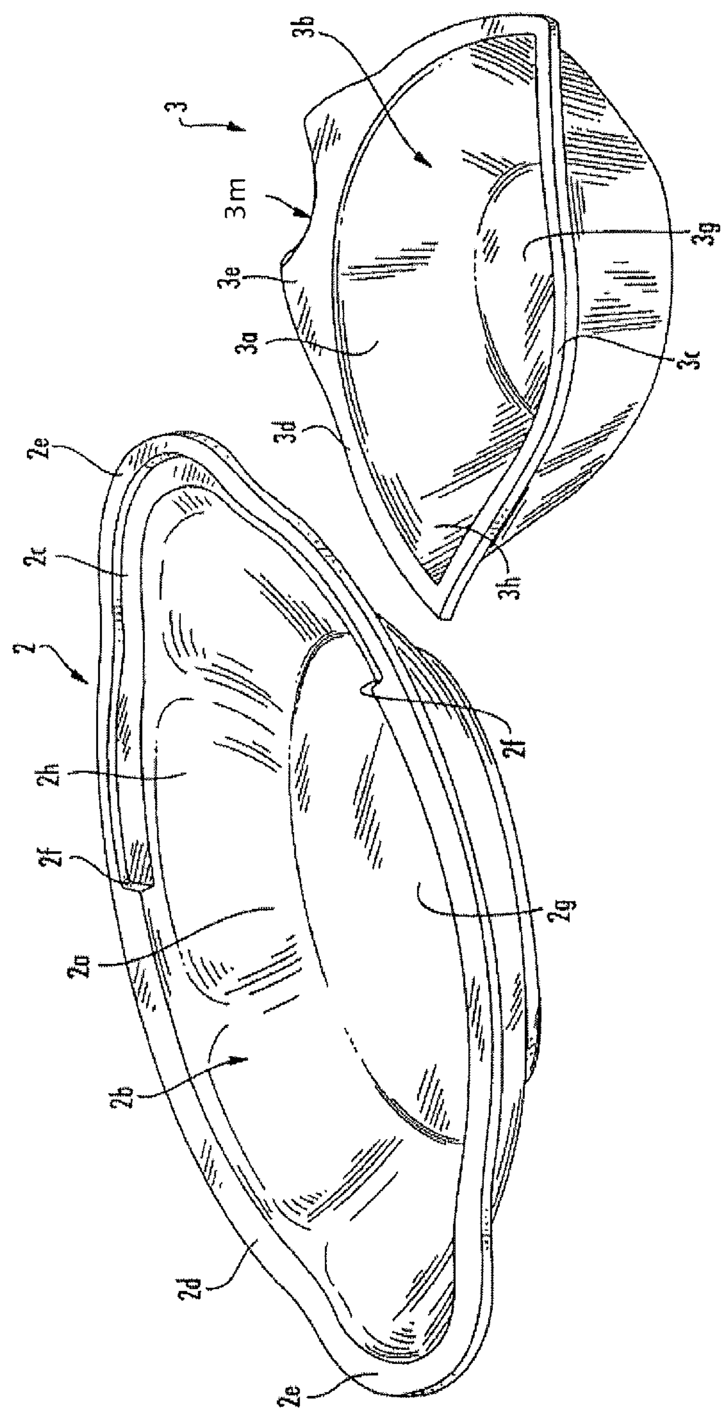
FIG. 2 is a perspective view of a main container and of a secondary container making up the package of FIG. 1 separated from each other.
Figure 4:
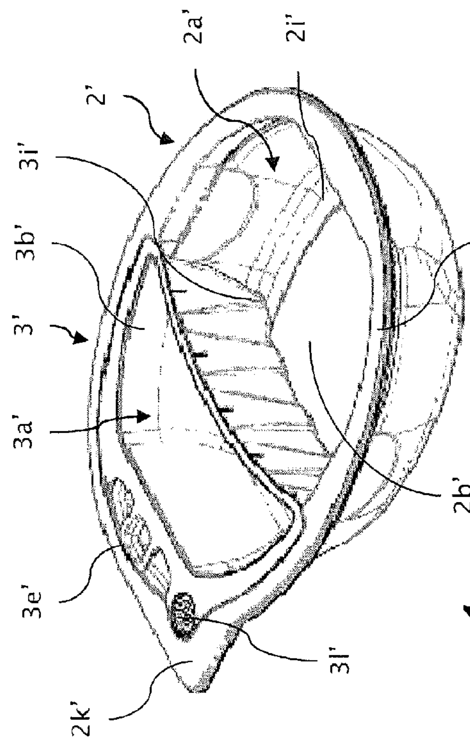
FIG. 4 is a perspective view of the package of FIG. 3 without its content and its covering film.
Figure 3:
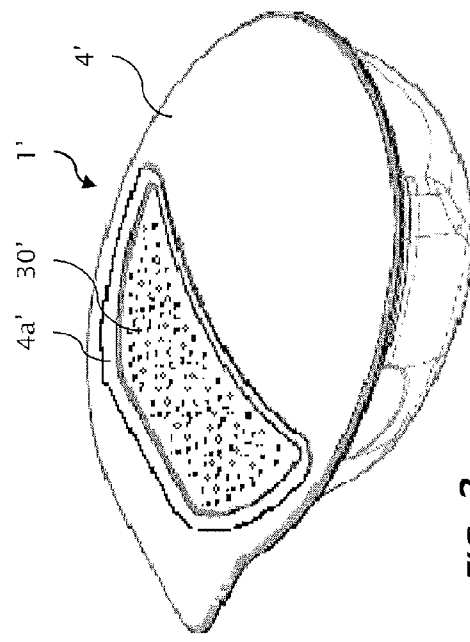
FIG. 3 is a perspective view of a second variant of a package made with the method according to the present finding.
Figure 6:
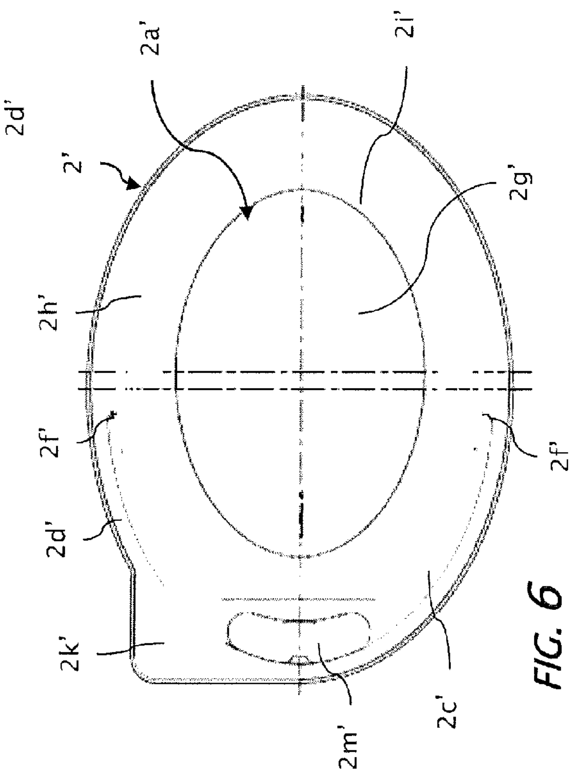
FIG. 6 is a view from above of a secondary container that makes up the package of FIG. 3.
Figure 5:
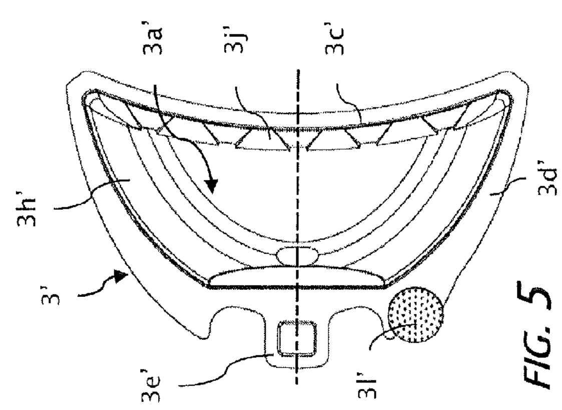
FIG. 5 is a view from above of a main container that makes up the package of FIG. 3.

With reference to the attached FIGS. 1-6, reference numerals 1 and 1' respectively identify a first and a second variant of a sterilised ready-meal package, both of which can be prepared with the method according to the present invention.

Preferably, the packages 1; 1' are of the type intended to be heated in a microwave.

Both of the packages 1; 1' comprise: a main container 2; 2', defining a main volume 2*a*; 2*a*' and having a first opening 2*b*; 2*b*' in the upper part; a main food product 20 (not visible in the representations relating to the second variant) contained inside at least part of said main volume 2*a*; 2*a*'; at least one secondary container 3; 3', defining a secondary volume 3*a*; 3*a*' and having a second opening 3*b*; 3*b*' in the upper part; at least one secondary food product 30; 30', contained inside at least part of said secondary volume 3*a*; 3*a*'; a removable covering film 4; 4' arranged to occlude said first opening 2*b*; 2*b*' and second opening 3*b*; 3*b'*.

The main food product can for example consist of pasta, rice or other cereals; the secondary food product 30; 30', again as an example, can be a sauce, a vegetable cream or other similar condiments. Such a secondary food product 30; 30' preferably has a liquid or semiliquid consistency. On the other hand, alternative embodiments of the present invention may provide for a main food product of the liquid type with a secondary food product 30; 30' having a solid consistency, or both products may be liquid or solid.

The main and secondary food products, for the reasons linked to minimising the headspace outlined above, preferably occupy at least 80% of the available free volume.

In the present description, the term free volume is used to indicate the volume inside the container available to be occupied by a product, delimited at the upper part by a plane lying on the opening before sterilisation.

The secondary container 3; 3' is associated in a removable manner inside the main container 2; 2', in such a manner to occupy part of the main volume 2*a*; 2*a*' and reduce the free volume available for the main food product to a portion of said main volume 2*a*; 2*a'*.

In particular, the secondary container 3; 3' preferably occupies a lateral portion of the main container 2; 2'.

The main container 2; 2' and the secondary container 3; 3' respectively comprise a first bottom wall 2*g*; 2*g*' and a second bottom wall 3*g*; 3*g*'. Such walls 2*g*; 2*g*', 3*g*; 3*g*' are preferably planar in such a manner to serve as support bases for the two containers 2; 2', 3; 3'. Preferably, the second bottom wall 3*g*; 3*g*' rests on the first bottom wall 2*g*; 2*g*' when the second container 3; 3' is associated with the first container 2; 2'. In both of the variants represented here, the first bottom wall 2*g*; 2*g*' has an elliptical contour, whereas the second bottom wall 3*g*; 3*g*' defines an ellipse portion.

The main container 2; 2' comprises a first edge 2*d*; 2*d*' developing along the periphery of the first opening 2*b*; 2*b*' and the secondary container 3; 3' comprises a second edge 3*d*; 3*d*' developing along the periphery of the second opening 3*b*; 3*b*'. When the package 1; 1' is closed, the first and the second edge 2*d*; 2*d*', 3*d*; 3*d*' are coplanar and in direct contact with the covering film 4; 4', which is integrally associated with both.

The covering film 4; 4', made from plastic material, thus entirely covers the upper portion of the package 1; 1'. It can be transparent, as illustrated with reference to the first variant, or opaque, as illustrated with reference to the second variant. In this last case, it is worth noting the presence of a transparent window 4*a*' for visual access to the secondary food product 30'.

The edges 2*d*; 2*d*', 3*d*; 3*d*' are joined to the respective bottom walls 2*g*; 2*g*', 3*g*; 3*g*' by means of respective side walls 2*h*; 2*h*', 3*h*; 3*h*'. The side walls 2*h*; 2*h*', 3*h*; 3*h*' have a concavity facing upwards; only in the second variant do such walls 2*h*', 3*h*' also have substantially flat sections at the vertices of the ellipse, in any case equipped with a slight inclination with respect to the vertical in order to ease the insertion of the second container 3' inside the first 2'. The edges 2*d*; 2*d*', 3*d*; 3*d*' develop externally projecting with respect to the rest of the containers to which they belong, and in particular projecting with respect to the side walls 2*h*; 2*h*', 3*h*; 3*h'*.

In order to constrain the position of the secondary container 3; 3' with respect to the main container 2; 2' holding it, such secondary container 3; 3' is accommodated in a shape-coupled manner inside the main container 2; 2' in a predefined zone of the latter.

The first edge 2*d*; 2*d*' of the main container 2; 2' of the package 1; 1' bears, for the purpose, a groove 2*c*; 2*c*' at such predefined zone of the main container 2; 2', intended to accommodate the secondary container 3; 3' and maintain it at a predefined position. The groove 2*c*, which develops internally along the first edge 2*d*; 2*d*', accommodates and supports the outer portion of at least part of the second edge 3*d*; 3*d*' in such a manner that the first and the second edge 2*d*; 2*d*', 3*d*; 3*d*' are coplanar as described above. The groove 2*c*; 2*c*' advantageously has two vertical abutment surfaces 2*f*; 2*f*' which prevent the secondary container 3; 3' from sliding towards the centre of the main container 2; 2'.

In the second variant illustrated in FIGS. 3-6, the package also comprises, again in order to define a unique mutual coupling between the two containers 2', 3', a peripheral channel 2*i*' that surrounds the elliptical bottom wall 2*g*' of the main container 2'. Such a channel is intended to accommodate a corresponding protrusion 3*i*' projecting below the bottom wall of the secondary container 3'.

Alternative embodiments may provide for alternative solutions to prevent the relative sliding between the two nested containers.

In the first variant embodiment, the secondary container 3 has, on the periphery of the second opening 3*a*, a spout 3*c* adapted to facilitate the pouring of the secondary food product 30 into the main container 2. The spout 3*c* is defined in particular by a concave trend towards the inside of the inner peripheral profile of the second opening 3*b*.

Such a feature is not replicated in the second variant, where, instead, the corresponding inner peripheral profile 3*c*' of the second opening 3*b*' has concavity facing outwards. Such a provision allows greater structural rigidity of the element, subject to high sealing pressures during the application of the covering film 4'.

Again with reference to the second variant, it should be noted that, under said inner peripheral profile 3*c*', the side wall 3*h*' of the secondary container 3' is substantially vertical and has a plurality of stiffening ribs 3*j*', also vertical. Such a feature contributes to discharging the sealing pressures applied on top of the secondary container 3'.

In both of the variant embodiments, the second edge 3*d*; 3*d*' comprises, preferably opposite the inner peripheral profile, a holding strip 3*e*; 3*e*', that extends projecting with respect to the adjacent portion of second edge 3*d*; 3*d*'. The holding strip 3*e*; 3*e*' facilitates grasping the secondary container 3; 3', providing in particular a holding point far from the secondary food product when it reaches a temperature such as to prevent its direct manipulation.

In particular, the holding strip 3*e*; 3*e*' is at least partially accommodated in the groove 2*c*; 2*c'*.

In the first variant, the accommodated portion of the strip 3*e* has a peripheral profile which has a recess slope 3*m*. Such peripheral profile, when the two containers are associated, is adjacent to a side surface of the groove 2*c* and it is far from the latter right at the recess slope 3*m*. Such recess has a shape and size adapted to allow the introduction of a finger of a consumer between the peripheral profile and the side surface of the groove 2*c*, so as to allow the strip 3*e* to be easily gripped.

In the second variant, again in order to facilitate grasping the strip 3*e*', the groove 2*c*' has an impression 2*m*', that allows the introduction of a finger around and below the strip 3*e*'. The strip 3*e*' has a rectangular shape with a central hole to facilitate its grasping.

In the first variant, the main container 2 has a longitudinal extension and comprises, at its opposite ends, two shaped projections 2*e* adapted to facilitate its holding. The groove 2*c*, which defines the position of the secondary container 3, is advantageously arranged at one of such shaped projections 2*e*; hence, the abutment surfaces 2*f* are transverse to the development of the main container.

In the second variant, the main container 2' has a substantially elliptical profile with the exception of a triangular ear 2*k*', arranged in an intermediate point between two successive vertices of the profile; in particular, such a point is arranged along the portion of the main container 2' that accommodates the secondary container 3'.

The triangular ear 2*k*' advantageously acts as a gripping flap for the covering film 4' during the opening of the package 1'. Given its position, it promotes a removal of the covering film 4' according to a diagonal that is oblique with respect to the axes of the package 1', so as to have an opening front that is misaligned with respect to the inner peripheral profile 3*c*' requiring less effort from the consumer engaged in removing the film.

Again to promote the opening operations, in the second variant the second edge 3*d*' comprises, at the triangular ear 2*k*', a rough portion 3*i*' (defined in this case by a dimpled disc) intended to facilitate the first detachment of the covering film 4' with respect to the secondary package 3'.

The materials used to make the main container 2; 2', the secondary container 3; 3' and the covering film 4; 4' are preferably all specifically intended to be inserted in an operating microwave oven, without deteriorating the organoleptic quality of the food products that they contain. In particular, they are preferably made with plastics suitable for use in microwave ovens.

In particular, the main container 2; 2' is preferably made from polypropylene thermoformed with co-extruded EVOH barrier, just as the covering film 4; 4' is preferably a PP/EVOH/PP barrier film. The secondary container 3; 3', on the other hand, is preferably made from polypropylene by injection moulding, a process that allows greater accuracy necessary for example to make the ribs 3*j*' of the second variant.

In order to highlight the ease of use of the packages 1; 1' described above by an end consumer, let us examine the operations that he performs at the moment of consumption.

Firstly, if needed, he takes care of heating or cooking the content of the package 1; 1', preferably in a microwave oven. Preliminarily, according to the type of food products present, he may or may not remove or perforate the covering means 4; 4'; moreover, may be required to add water inside the main volume 2*a*; 2*a*' or the secondary volume 3*a*; 3*a'*.

If the secondary volume 3*a*; 3*a*' contains a product with liquid consistency like a sauce, the covering means 4; 4' will preferably be partially removed so as to allow steam to escape just from the second opening 3*b*; 3*b'*.

Once the package 1; 1' has been heated, or even prior to introduction into the oven, the consumer carries out the mixing of the two food products. In this step, he introduces a finger at the recess slope 3*m* or the impression 2*m*', he grips the holding strip 3*e*; 3*e*' and extracts the secondary container 3; 3' from the main container 2; 2'. Consequently, the main food product distributes in the entire main volume 2*a*; 2*a*', now completely available. At this point, by inclining the secondary container 3; 3', the consumer pours (possibly through the spout 3*c*) the secondary food product 30; 30' inside such a main volume 2*a*; 2*a*', where he can easily mix and consume the prepared food.

Figure 8:
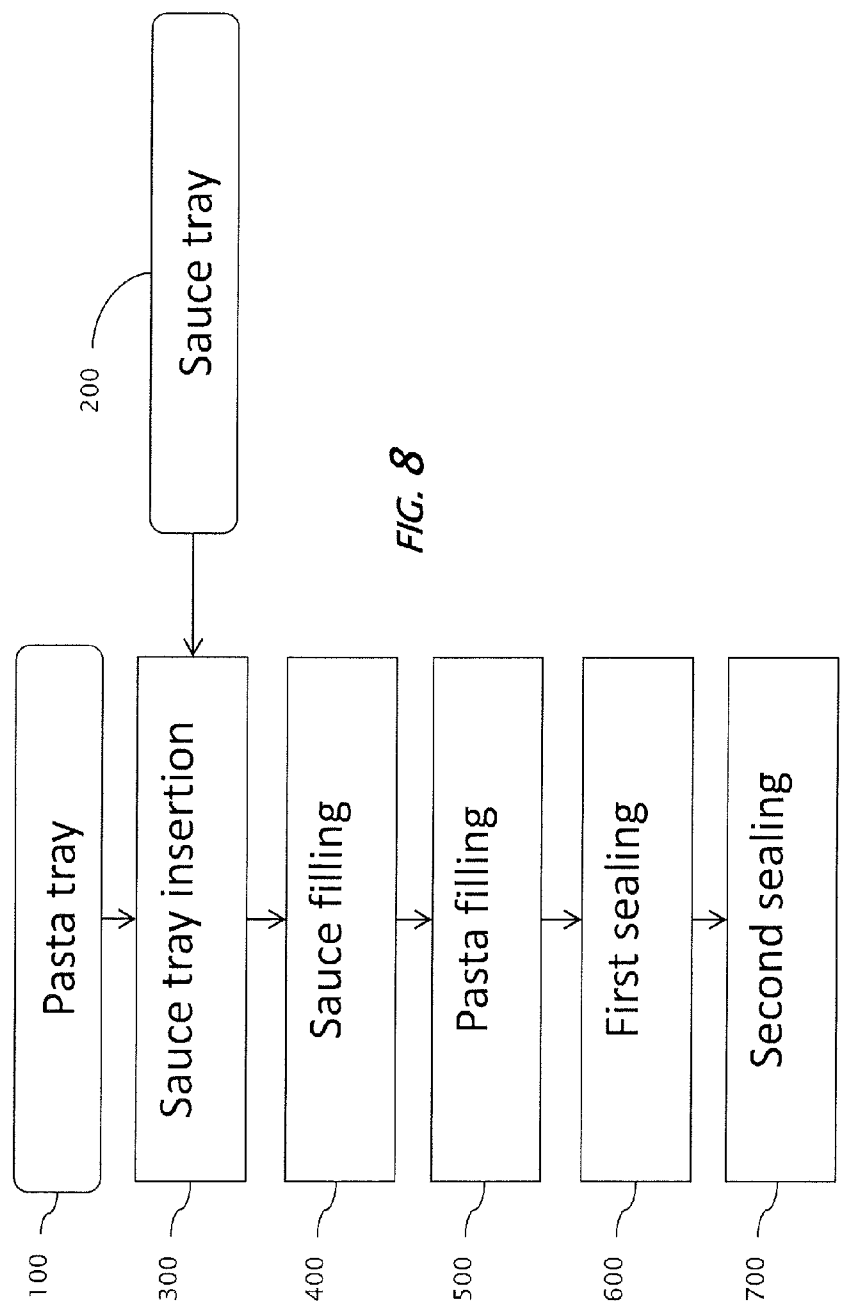
FIG. 8 represents a flow-chart of the method for preparing a package according to the present invention.

With reference to FIG. 8, let us now pass to describing the preparation method according to the present invention, which makes it possible to make a sterilised ready-meal package 1; 1' according to one of the variants described earlier purely as an example.

Figure 9:
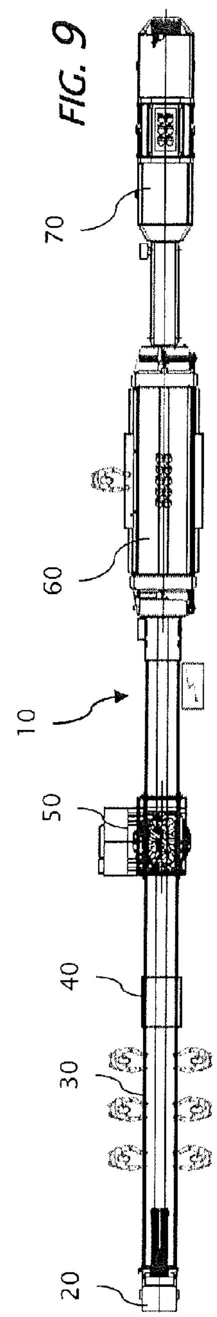
FIG. 9 represents the packaging process for carrying out the preparation method according to the present invention.

In order to make the subsequent steps of the method more intelligible, they are illustrated hereafter with reference to an example packaging line 910, of the type depicted in FIG. 9.

The method preliminarily carries out a step of making 100 the main container 2; 2' and a step 200 of making the secondary container 3; 3'. As stated earlier, the main container 2; 2' is preferably made by thermoforming in polypropylene with EVOH barrier, whereas the secondary container 3; 3' is preferably made by injection moulding again from polypropylene.

At an end upstream of the packaging line 910 there is a feeding station 920 for the main containers 2; 2', which are directed on a linear conveyor belt towards the successive processing stations.

Downstream of the feeding station 920 there is an introduction station 930 of the secondary container 3; 3', at which an introduction step 300 of the secondary container 3; 3' inside the main container 2; 2' directed on the conveyor belt is carried out.

Such an introduction step 300 can be carried out manually by special workers, as illustrated in the attached FIG. 9; alternatively, there can be automatic positioning means of the secondary container 3; 3' in the main container 2; 2'.

The secondary container 3; 3' is introduced in its correct nested position inside the main container 2; 2', as described earlier with reference to the packages 1; 1'. In particular it should be noted that the secondary container 3; 3' is preferably introduced into a side portion of the main volume 2*a*; 2*a*', and moreover the first edge 2*d*; 2*d*' and the second edge 3*d*; 3*d*' are flush.

The two assembled containers 2; 2', 3; 3' are then conveyed to a subsequent first filling station 940, at which a step of introducing 400 at least one secondary food product 30; 30' inside the secondary volume 3*a*; 3*a*' is carried out.

The secondary food product 30; 30', as discussed earlier, is preferably represented by a sauce or other food with liquid or semi-liquid consistency, so that the first filling station 940 can advantageously comprise a dispensing nozzle for delivering such a product.

In this step, the secondary food product 30; 30' is introduced in a quantity such as to occupy at least 80% of the secondary volume 3*a*; 3*a*' available; in general, the headspace is preferably reduced as much as possible in view of the subsequent sterilisation in an autoclave.

Once the secondary container 3, 3' has been filled, the assembled containers 2; 2', 3; 3' are conveyed to a second filling station 950, at which a step of introducing 500 at least one main food product inside the main volume 2*a*; 2*a'* is carried out.

The main food product, as discussed earlier, is preferably represented by a pasta or other food with solid consistency, so that the first filling station 950 can advantageously comprise a gravity dispenser or a robotic head for delivering such a product.

In this step, the secondary food product 30; 30' is introduced in a quantity such as to occupy at least 80% of the free volume left available in the main container 2; 2' after the introduction of the secondary container 3; 3'; in general, the headspace is preferably reduced as much as possible in view of the subsequent sterilisation in an autoclave.

Once the filling is complete, the package 1; 1' is conveyed to a first sealing station 960 for the application of the covering film 4; 4'.

The first sealing station 960 comprises a first sealing head by means of which a step of making 600 a perimetric seal between the covering film 4; 4' and the first edge 2*d*; 2*d'* of the package 1; 1' is carried out.

It should be noted that, to carry out the perimetric seal, the covering film 4; 4' must be arranged to cover said first and second opening 2*b*; 2*b'*, 3*b*; 3*b'*. Such an operation can be carried out preliminarily to the operation of the first sealing head or simultaneously with it; the same cutting to size of the covering film 4; 4' above the upper perimeter of the package 1; 1' can be carried out in conjunction with the lowering of the first sealing head.

Figure 7:
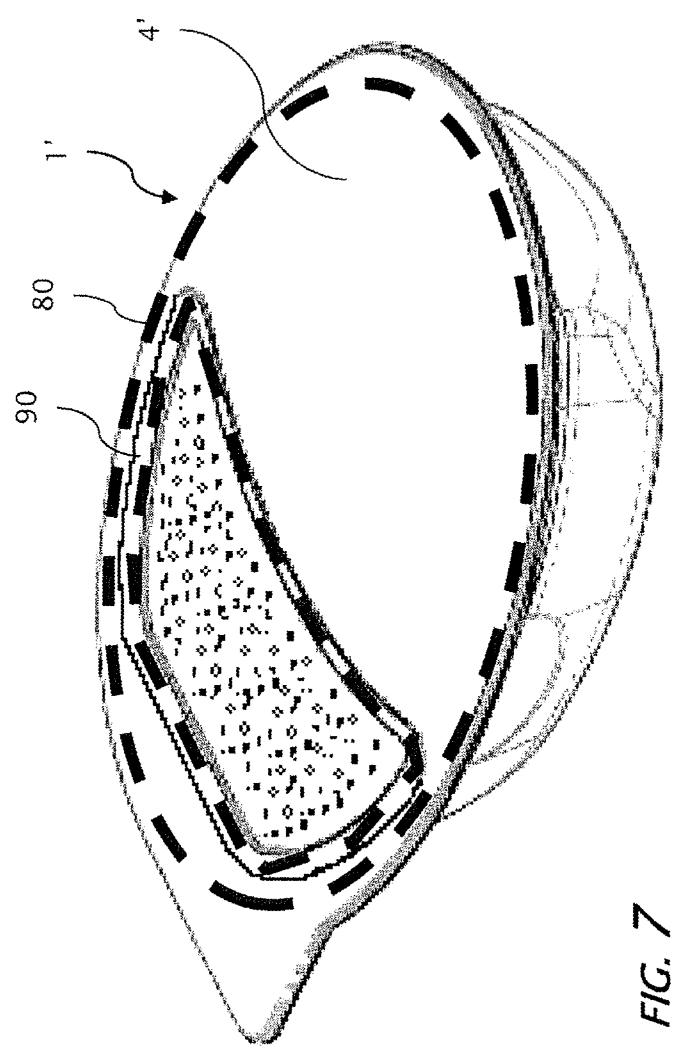
FIG. 7 is a perspective view of the package of FIG. 3, on which two sealing profiles relative to the method according to the present invention are highlighted.

The perimetric seal follows a first closed sealing profile 80, visible in FIG. 7, which engages just the first edge 2*d*; 2*d'* of the package 1; 1'. In other words, the first sealing head does not press on any part of the secondary container 3; 3' while the perimetric seal is being carried out. The perimetric seal follows the outer perimeter of the package to be covered; in the variants of package 1; 1' exemplified in the present description, it has in particular a first sealing profile 80 that is substantially elliptical.

The perimetric seal is a heat seal made at the interface between the plastic material of the first edge 2*d*; 2*d'* and a plastic material that defines the most inner layer of the covering film 4; 4', which can for example be made from polypropylene.

The heat sealing is carried out by conduction through the heating of the first sealing head, which lies above the covering film 4; 4'. It should be noted that a suitable counter-mould can be envisaged beneath the first edge 2*d*, 2*d'* during the sealing operation to discharge the high pressures applied.

In a preferred embodiment of the method, in carrying out the perimetric seal the first sealing head, heated to a first temperature $\theta_1$ equal to 200° C., applies a force equal to about 45 kN for a dwell time $T_1$ equal to 1 s. In particular, the force of 45 kN is transmitted by means of a mechanical actuator, and is distributed over ten packages that are simultaneously sealed at the first sealing station 960. Given a contact area of the first sealing profile 80 that can be estimated at about 50 $cm^2$ for each package, the first sealing pressure $P_1$ resulting is about 9 bar.

The values proposed above, although purely examples, ensure a high strength of the perimetric seal compatible with the subsequent sterilisation operations in an autoclave.

Once the perimetric seal is completed, the package 1; 1' is conveyed to a second sealing station 970.

The second sealing station 970 comprises a second sealing head by means of which a step of making 700 an inner seal between the covering film 4; 4' and the second edge 3*d*; 3*d'* of the package 1; 1' is carried out.

The inner seal follows a second closed sealing profile 90, visible in FIG. 7, which engages just the second edge 3*d*; 3*d'* of the secondary container 3; 3'. The inner seal follows the outer perimeter of the secondary container 3; 3'; in the variants of package 1; 1' exemplified in the present description, it has in particular a second sealing profile 90 that encloses an ellipse portion. It should be noted that the second sealing profile 90 completely separates the secondary food product 30; 30' with respect to the main food product 20.

The perimetric seal is a heat seal made at the interface between the two plastic materials of the second edge 3*d*; 3*d'* and of the inner layer of the covering film 4; 4'. The heat seal is made by conduction through the heating of the second sealing head, which lies over the covering film 4; 4'. It should be noted that, in the second variant of the package 1', the pressures applied during the sealing can be discharged onto the stiffening ribs 3*j'*.

In a preferred embodiment of the method, in carrying out the inner seal the second sealing head, heated to a second temperature $\theta_2$ equal to 195° C., applies a second pressure $P_2$ equal to 2.5 bar for a dwell time $T_2$ equal to 0.6 s.

The second sealing station 970 comprises in particular pressure-controlled pneumatic actuators provided to carry out the inner seal on six packages at a time.

The values proposed above, although purely examples, ensure a sufficient seal of the inner seal to avoid migrations of vapour between the inner compartments during the subsequent sterilisation operations in an autoclave.

Moreover, the method comprises a step of sterilising the ready-meal package 1; 1' coming out from the packaging line 910 in an autoclave. The sterilisation, as discussed earlier, makes the reduction of headspace essential in the preparation of the package 1; 1'.

The covering film 4; 4' upperly delimits the entire free volume available for the food products contained in the containers. In practice, by occupying at least 80%, preferably 90% of the free volume of the two containers, there remains a headspace comprised between the upper level of the food product and the covering film 4; 4' of no more than 10-20% of such free volume.

An advantage of the invention is the extreme ease of opening of the package carried out with the method described above.

Another advantage derives from the excellent characteristics of strength and tightness relative to the outer perimeter of the package.

Another advantage of the invention is the simplicity and the low manufacturing costs of the package.

Another advantage of the invention derives from the easy manipulation of the elements that make up the package during the steps of introduction into the microwave oven of the finding and of mixing the food products that it comprises.

A further advantage of the invention concerns the possibility of heating the package according to the finding in a microwave oven without deterioration of the organoleptic qualities of the food products that make it up.

Obviously, the aforedescribed finding may be subjected to numerous modifications and variants—by a man skilled in the art with the aim of meeting the possible and specific requirements—all falling within the scope of protection of the invention as defined by the following claims.

The invention claimed is:

1. A method for preparing a sterilised ready-meal package, comprising the steps of:

providing a main container defining a main volume intended to accommodate a main food product, and having a first opening at an upper part surrounded by a first planar edge;

providing at least one secondary container defining a secondary volume and having a second opening at the upper part surrounded by a second planar edge;

introducing said secondary container inside the main container, so that said first edge and said second edge are flush;

introducing at least one secondary food product inside the secondary volume;

introducing at least one main food product inside the main volume;

making, by means of a first sealing head facing the first edge, a perimetric seal between a covering film, arranged to cover said first and second opening, and said first edge;

making, by means of a second sealing head facing the second edge and physically distinct from the first sealing head, an inner seal between the covering film and the second edge.

2. The method according to claim 1, wherein in making the perimetric seal, the first sealing head applies a first pressure above the covering film; in making the inner seal the second sealing head applies a second pressure above the covering film; said first pressure being greater than said second pressure.

3. The method according to claim 2, wherein said second pressure is less than 5 bar.

4. The method according to claim 2, wherein said first pressure is more than 5 bar.

5. The method according to claim 1, wherein a dwell time of the first sealing head in making the perimetric seal is longer than a dwell time of the second sealing head in making the inner seal.

6. The method according to claim 5, wherein the dwell time of the first sealing head is more than 0.8 s and the dwell time of the second sealing head is less than 0.8 s.

7. The method according to claim 1, wherein in making the perimetric and inner seals, temperatures of the first and second sealing head are above a melting temperature of the covering film, so as to make a heat sealing.

8. The method according to claim 7, wherein said covering film is made from plastic material and said temperature of the first and second sealing head are comprised between 180° C. and 220° C.

9. The method according to claim 1, wherein the first sealing head defines a first sealing profile and the second sealing head defines a second sealing profile, both of the sealing profiles being closed profiles.

10. The method according to claim 9, wherein said first sealing profile follows said first edge without involving the second edge.

11. The method according to claim 1, comprising a preliminary step of thermoforming the main container in polypropylene with co-extruded EVOH barrier.

12. The method according to claim 1, wherein said first edge is made projecting towards the outside with respect to the ready-meal package, said step of making the perimetric seal involving the application of a counter-mould beneath said first edge.

13. The method according to claim 1, wherein said step of making the perimetric seal and said step of making the inner seal are made at two distinct times.

14. The method according to claim 1, also comprising a step of sterilising the ready-meal package in an autoclave after the steps of making the perimetric seal and the inner seal.

15. The method according to claim 1, wherein said steps of making a perimetric and inner seal are carried out by means of one or more sealing stations that comprise at least one first sealing head and at least one second sealing head that are distinct from one another, respectively arranged to make said perimetric seal and said inner seal.

16. The method according to claim 1, wherein said perimetric seal and said inner seal are both peelable seals, said perimetric seal being stronger than said inner seal.

* * * * *